(12) United States Patent
Yeddu

(10) Patent No.: US 12,086,038 B2
(45) Date of Patent: Sep. 10, 2024

(54) UNSUPERVISED LOG DATA ANOMALY DETECTION

(71) Applicant: KYNDRYL, INC., New York, NY (US)

(72) Inventor: Dinesh Babu Yeddu, Guntur (IN)

(73) Assignee: Kyndryl, Inc., New York, NY (US)

( * ) Notice: Subject to any disclaimer, the term of this patent is extended or adjusted under 35 U.S.C. 154(b) by 213 days.

(21) Appl. No.: 17/142,278

(22) Filed: Jan. 6, 2021

(65) Prior Publication Data

US 2022/0214948 A1    Jul. 7, 2022

(51) Int. Cl.
*G06F 11/00* (2006.01)
*G06F 11/14* (2006.01)
*G06N 3/08* (2023.01)

(52) U.S. Cl.
CPC .......... *G06F 11/1471* (2013.01); *G06N 3/08* (2013.01)

(58) Field of Classification Search
CPC ...................................................... G06N 3/08
See application file for complete search history.

(56) References Cited

U.S. PATENT DOCUMENTS

| | | | | |
|---|---|---|---|---|
| 10,592,544 | B1* | 3/2020 | Dasgupta ................. | G06N 3/08 |
| 10,810,491 | B1* | 10/2020 | Xia .......................... | G06N 3/04 |
| 11,099,928 | B1* | 8/2021 | Vah ...................... | G06F 11/0793 |
| 11,163,731 | B1* | 11/2021 | Riddell ................. | G06F 7/5443 |
| 11,366,842 | B1* | 6/2022 | Swaminathan ......... | G06F 17/18 |
| 11,392,821 | B2* | 7/2022 | Rafey ................... | G06K 9/6223 |
| 11,568,173 | B2* | 1/2023 | Alshawabkeh ........ | G06N 3/045 |
| 11,631,031 | B2* | 4/2023 | Mukherjee .............. | G06N 5/01 |
| | | | | 706/12 |
| 11,663,523 | B2* | 5/2023 | Polleri ................... | G06F 9/541 |
| | | | | 706/12 |
| 11,669,735 | B2* | 6/2023 | Shaabana ........... | G06F 11/1476 |
| | | | | 706/20 |
| 11,777,970 | B1* | 10/2023 | Wainer .................. | G06N 20/00 |
| | | | | 726/23 |
| 11,853,415 | B1* | 12/2023 | Wainer ................. | G06F 21/552 |
| 2004/0039968 | A1* | 2/2004 | Hatonen ................. | G06N 3/08 |
| | | | | 714/39 |
| 2011/0154119 | A1* | 6/2011 | Wang ..................... | G06F 11/006 |
| | | | | 714/E11.029 |
| 2011/0296244 | A1 | 12/2011 | Fu | |
| 2015/0052090 | A1 | 2/2015 | Lin et al. | |
| 2016/0048778 | A1* | 2/2016 | Sharon ................. | G06Q 30/016 |
| | | | | 705/7.11 |
| 2017/0063907 | A1* | 3/2017 | Muddu ................. | G06F 40/134 |

(Continued)

OTHER PUBLICATIONS

Bursic et al., "Anomaly Detection From Log Files Using Unsupervised Deep Learning", Research Gate, Preprint—Sep. 2019, 9 pages.

(Continued)

*Primary Examiner* — Loan L. T. Truong
(74) *Attorney, Agent, or Firm* — Erik Swanson; Andrew M. Calderon; Calderon Safran & Wright P.C.

(57) ABSTRACT

Detecting log data anomalies by pre-processing log data entries, identifying sequences of the log data entries, generating at least one key performance indicator (KPI) for the log data entries according to the sequences, training at least one machine learning (ML) model according to the KPI, and identifying a log data entry anomaly according to the machine learning model.

19 Claims, 5 Drawing Sheets

(56) References Cited

U.S. PATENT DOCUMENTS

| | | | |
|---|---|---|---|
| 2017/0139806 A1 | 5/2017 | Xu | |
| 2018/0275970 A1* | 9/2018 | Woulfe | G06F 8/70 |
| 2018/0276584 A1* | 9/2018 | Woulfe | G06Q 10/0635 |
| 2019/0171622 A1* | 6/2019 | Zong | G06F 16/24542 |
| 2019/0228086 A1* | 7/2019 | Bordens | G06F 21/62 |
| 2019/0362245 A1* | 11/2019 | Buda | G06F 17/18 |
| 2020/0050759 A1* | 2/2020 | Duttachoudhury | G06F 21/554 |
| 2020/0065384 A1* | 2/2020 | Costello | G06N 3/04 |
| 2020/0222047 A1 | 7/2020 | Shelton, IV et al. | |
| 2020/0302224 A1* | 9/2020 | Jaganathan | G06N 3/045 |
| 2021/0240691 A1* | 8/2021 | Bertoni Scarton | G06F 40/205 |
| 2021/0287068 A1* | 9/2021 | Srinivas | G06F 11/0766 |
| 2021/0344695 A1* | 11/2021 | Palani | G06N 3/08 |
| 2022/0066906 A1* | 3/2022 | Kumar | G06F 11/328 |
| 2022/0122000 A1* | 4/2022 | Li | G06K 9/6227 |
| 2022/0188690 A1* | 6/2022 | Rawat | G06K 9/628 |
| 2022/0405592 A1* | 12/2022 | Niu | G06F 40/216 |

OTHER PUBLICATIONS

Du et al., "DeepLog: Anomaly Detection and Diagnosis from System Logs through Deep Learning", CCS'17, Oct. 30-Nov. 3, 2017, Dallas, TX, USA, 14 pages, DOI: http://dx.doi.org/10.1145/3133956.3134015.

Grover, Aarish, "Anomaly Detection for Application Log Data", San Jose State University SJSU ScholarWorks, Master's Theses and Graduate Research, Spring 2018, 49 pages, DOI: https://doi.org/10.31979/etd.znsb-bw4d.

Hamooni et al., "LogMine: Fast Pattern Recognition for Log Analytics", CIKM'16, Oct. 24-28, 2016, Indianapolis, IN, USA, 10 pages, DOI: http://dx.doi.org/10.1145/2983323.2983358.

Landauer et al., "Dynamic log file analysis: An unsupervised cluster evolution approach for anomaly detection", ScienceDirect, Computers & Security 79, Available online Sep. 4, 2018, pp. 94-116.

Mell et al., "The NIST Definition of Cloud Computing", Recommendations of the National Institute of Standards and Technology, Special Publication 800-145, Sep. 2011, 7 pages.

Nan et al., "Anomaly Sequences Detection from Logs Based on Compression", arXiv:1109.1729v1 [cs.LG] Sep. 8, 2011, 8 pages.

Yang et al., "Log File Anomaly Detection", Semantic Scholar, Published 2016, 10 pages.

Yang et al., "nLSALog: An Anomaly Detection Framework for Log Sequence in Security Management", IEEE Access, Special Section on Artificial Intelligence (AI)-Empowered Intelligent Transportation Systems, date of current version Dec. 23, 2019, 13 pages, Digital Object Identifier 10.1109/ACCESS.2019.2953981.

* cited by examiner

UNSUPERVISED LOG DATA ANOMALY DETECTION

BACKGROUND

The disclosure relates generally to the detection of anomalies in system log data. The disclosure relates particularly to detecting log data anomalies according to meta data and log data hidden features.

Process automation systems includes logs of system activity data. Normal and abnormal system activities are captured in these logs. Analysis of system activity logs enables understanding of system performance and root causes analysis of system performance declines and outages. System activity logs may include multiple millions of log data entries.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the detection of system activity log data anomalies.

Aspects of the invention disclose methods, systems and computer readable media associated with detecting log data anomalies by pre-processing log data entries, identifying sequences of the log data entries, generating at least one key performance indicator (KPI) for the log data entries according to the sequences, training at least one machine learning (ML) model according to the KPI, and identifying a log data entry anomaly according to the machine learning model.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
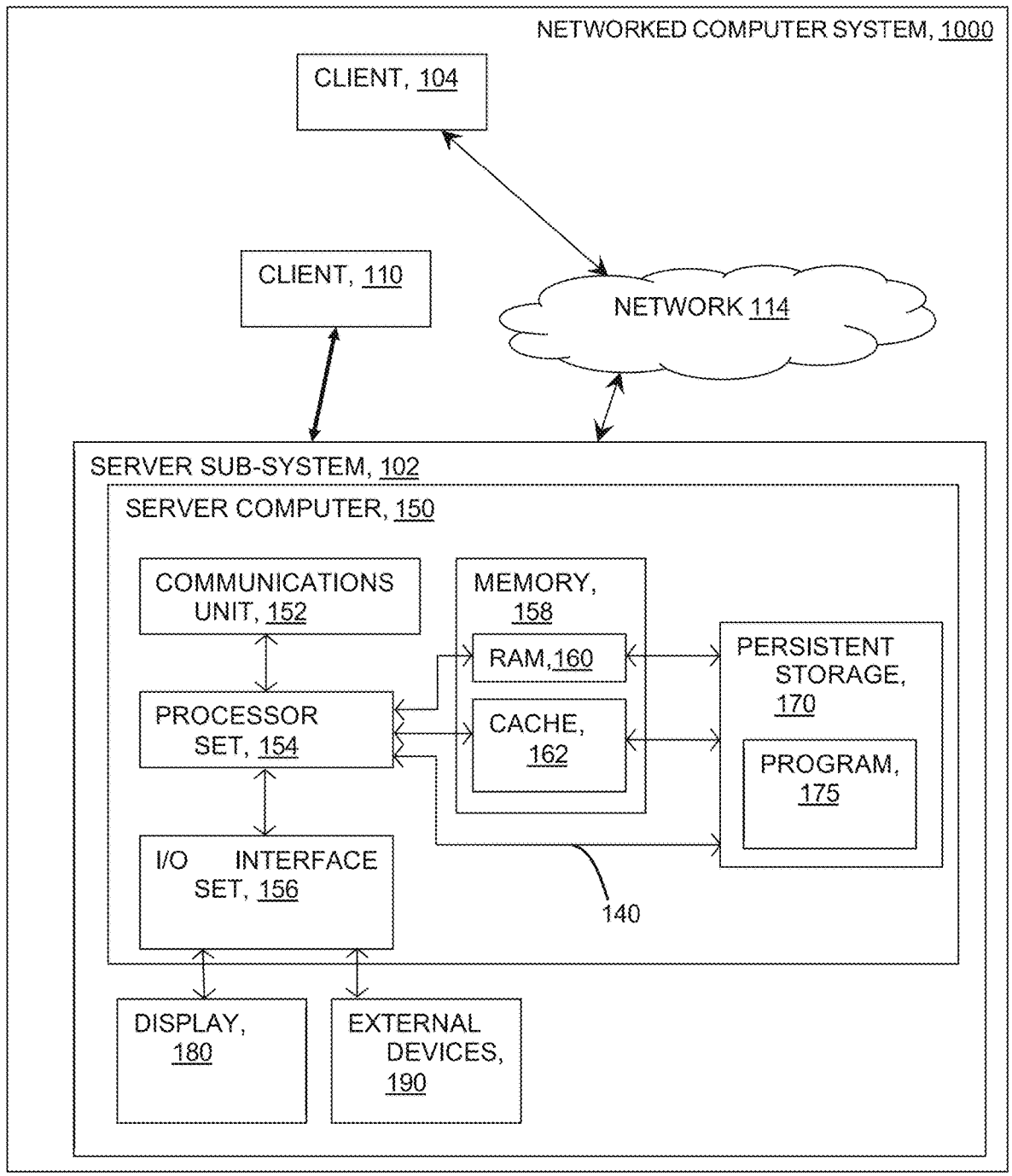
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., training machine learning models and utilizing the trained models, pre-processing log data entries, identifying sequences of the log data entries, generating at least one key performance indicator (KPI) for the log data entries according to the sequences, training at least one machine learning (ML) model according to the KPI, and identifying a log data entry anomaly according to the machine learning model etc.). These solutions are not abstract and cannot be performed as a set of mental acts by a human due to the processing capabilities needed to facilitate system activity log data anomaly detection, for example. Further, some of the processes performed may be performed by a specialized computer for carrying out defined tasks related to system activity log anomaly detection. For example, a specialized computer can be employed to carry out tasks related to activity log data anomaly detection, or the like.

Methods for activity log data anomaly detection include supervised machine learning-based methods where large quantities of log data are labeled and utilized for training a model. The model classifies or predicts a label for new data according to the similarities between the new data and the labeled training data. Methods may utilize similarity measurements between new log entry text and training data set log entry texts used in supervised training of a deep learning model. Dynamic log file analysis uses unsupervised cluster evolution of log entry data to identify log entries which are anomalous in terms of a spatial classification when compared to spatially clustered historic log entry data. Disclosed embodiments enable anomaly detection in activity log data with consideration of multiple dimensions of meta features of the log data when compared to historic training data sets.

System activity logs include streams of individual log entries. As logs are intended to be readable by humans, entries include text portions related to the underlying entry cause. Such activity logs are not standardized and are instead customized to monitor an underlying system. Normal system activities result in log entries as do abnormal system activities. A sequence of otherwise normal system activities and associated log entries may actually relate to an abnormal or anomalous system activity.

Disclosed embodiments detect anomalies according to hidden features extracted from the time series log entry data. Hidden features relate to meta data of the log entries rather than the specific details of any single entry or set of entries. These hidden log data features are repeating sequences of log data entries identified by the methods. Hidden log data features may be associated with log entry sentiment sequences, the frequency of log entry sequences over regular time intervals, the time intervals between specific sequences, and the time duration associated with the occurrence of specific log data entry sequences. System abnormalities may be detected by identifying log entry data sequences outside the normal distribution of log entry sequences in any of these four dimensions. Detected anomalies may be brought to the attention of a user through an application program interface (API) or another user interface.

In an embodiment, the anomaly detection method pre-processes log entry data, assigns identifiers to pre-processed data, extracts hidden sequence features, generates key performance indicator (KPI) distributions associated with system activities, trains machine learning (ML) models using the hidden feature sequence data associated and KPI distributions, and processes new log entry data to identify anomalies using the trained ML models. Disclosed methods apply statistical methods to raw log entry data to remove outliers prior to training ML models with the data. Such statistical normalization of the raw log data enables unsupervised training of the ML models. To test the trained ML models, the trained ML models process the raw training data—data without statistical normalization—to detect anomalies in the training log entry data. After training and testing the method processes new log entry data using the set of trained ML models. In an embodiment, the method utilizes three separate ML model structures and identifies log entry data anomalies according to a majority vote among the three ML model results.

In an embodiment, anomaly detection methods begin with the pre-processing of the activity log data entries of a series of historical log entries. The historical activity log data entries include a series of entries arrayed along a common timeline. Each entry further includes a time stamp indicating the time of the entry. Entries include constant parts and variable parts. The constant parts include special formatting characters and strings relating to system parameters. During pre-processing, the method removes special characters from the entry as well as system parameter strings. Pre-processing yields a text portion from each activity log entry. In this embodiment, the method compiles tables with the text portions from the series of activity log entries. Each table entry includes a single text portion from a corresponding log entry.

In an embodiment, after pre-processing, the method assigns an identifier to each entry of the table. The identifier relates to the text of the entry. The method assigns the same identifier to entries having the same text portions. The pre-processing yields a table of log entry text portions in chronological order and labeled with identifiers. As an example, log entry text portions may be labeled with identifiers such as L1, L2, L3 . . . . After labeling a log entry as L1, the method subsequently labels all identical log entries as L1, etc.

In an embodiment, the method extracts the hidden log sequence features by unsupervised analysis of the labeled log entry tables. In an embodiment, the method compiles new hidden feature tables including an index, a table entry type (e.g. "list"), the sequence details, e.g., [['L1", "L3", 'L2", "L5'], 3], wherein the "3" indicates the number of occurrences of the sequence in the evaluated series of log entries. In an embodiment, the table may further include time stamp information associated with the sequence and log entries. The hidden feature tables include information on the hidden log entry sequences, the frequency and timing of the sequences, the duration of the log entry sequence, and the sentiments (positive/negative) of the log entries making up each sequence.

In an embodiment, the method generates KPIs for the set of historical log entry data used to compile the hidden feature tables. The method determines data distributions for log entry sentiments using, for example, a compiled dictionary of common log entry terms, each dictionary entry including a sentiment indication—positive or negative. The method determines an overall sentiment for a log entry according to presence/absence of negative sentiment terms in the entry. In an embodiment, the method classifies an entry including at least one negative dictionary term classified as having a negative sentiment. The method determines a distribution of the frequency of occurrence for regular intervals—per minute, hour, day, week, etc., for each of the hidden feature sequences. The method determines the distribution of time intervals between hidden feature log entry sequences, and the method determines the distribution of time durations for each of the hidden feature log entry sequences.

In an embodiment, the method trains a set of ML models using the hidden feature sequences and the associated KPI distributions for the hidden feature sequences. The method uses recurrent neural network (RNN) models such as Long Short-term Memory (LSTM) models to evaluate the historic log entry data. Prior to using the historic data for training models, the method normalizes the historic data set using a statistical box technique to normalize the training data set and remove outlier/anomalies from the training data set. The statistical box normalizes the data along one or more data set dimensions defining a normalized statistical box which holds the entire training data set. The resulting normalized data set yields a model capable of classifying new log entry data sequences as either normal—within the recognized boundaries of the sequence features of the normalized data set, or as abnormal—having sequence features either outside the normal distribution of features, or far from the mean features for the normal distribution in terms of the standard deviation of the normal distribution.

In an embodiment, the method trains an LSTM model including an autoencoder. This model autoencoder extracts features from new log data sequences according to the training with the normalized historic data and compares the extracted features to the feature distribution for the normalized data set. The method identifies log data entry series having extracted features outside the normal distribution or more than, for example purposes only, 2 standard deviations from the mean for the distribution of the trained model, as anomalous.

In an embodiment, the method trains an LSTM model with uncertainty estimation. In this embodiment, the method trains the LSTM model using the normalized historic log entry data and KPI distribution data yielding a feature embedding vector distribution for the training data. The method considers all normalized training data as labeled "normal". Subsequent to training, the method extracts a feature embedding for the new log entry sequence data and determines a certainty level for the data relating the certainty that the feature embedding of the new log entry sequence data conforms to the feature embedding distribution of the training data. The method determines a distance between the feature embedding vector for the new data and the vectors of the feature embedding distribution set of the normalized training data.

In an embodiment, the method trains an LSTM model with dropouts using the normalized training data set. In this embodiment, the method effectively broadens the training data set by randomly dropping out RNN node weights during training epochs. The dropouts reduce the possibility of overfitting the model to the training data making the model more resilient and less likely to generate a false positive anomaly. After training the method processes new log entry series data. The model classifies the new log entry series as either normal or abnormal in terms of having a pattern conforming to the patterns of the training data set after training with dropouts.

In an embodiment, the method compares the normal/abnormal classification result from each of an LSTM with dropout, LSTM with certainty/uncertainty, and LSTM with autoencoder and determines a final classification according to the majority of the "votes" of the three ML models. In this embodiment, the method provides this final classification for the analyzed new log entry series. For log entry series identified as anomalous, the method further provides the details of the hidden feature sequences classified as anomalous.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise anomaly detection program (not shown) together with sufficient computing resource (processor, memory, network communications hardware) to execute the program. Client devices 104 and 110 provide user access to the functionality of anomaly detection program 175 enabling a user to provide input to the program and to receive output from the anomaly detection program 175. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the anomaly detection program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., anomaly detection program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
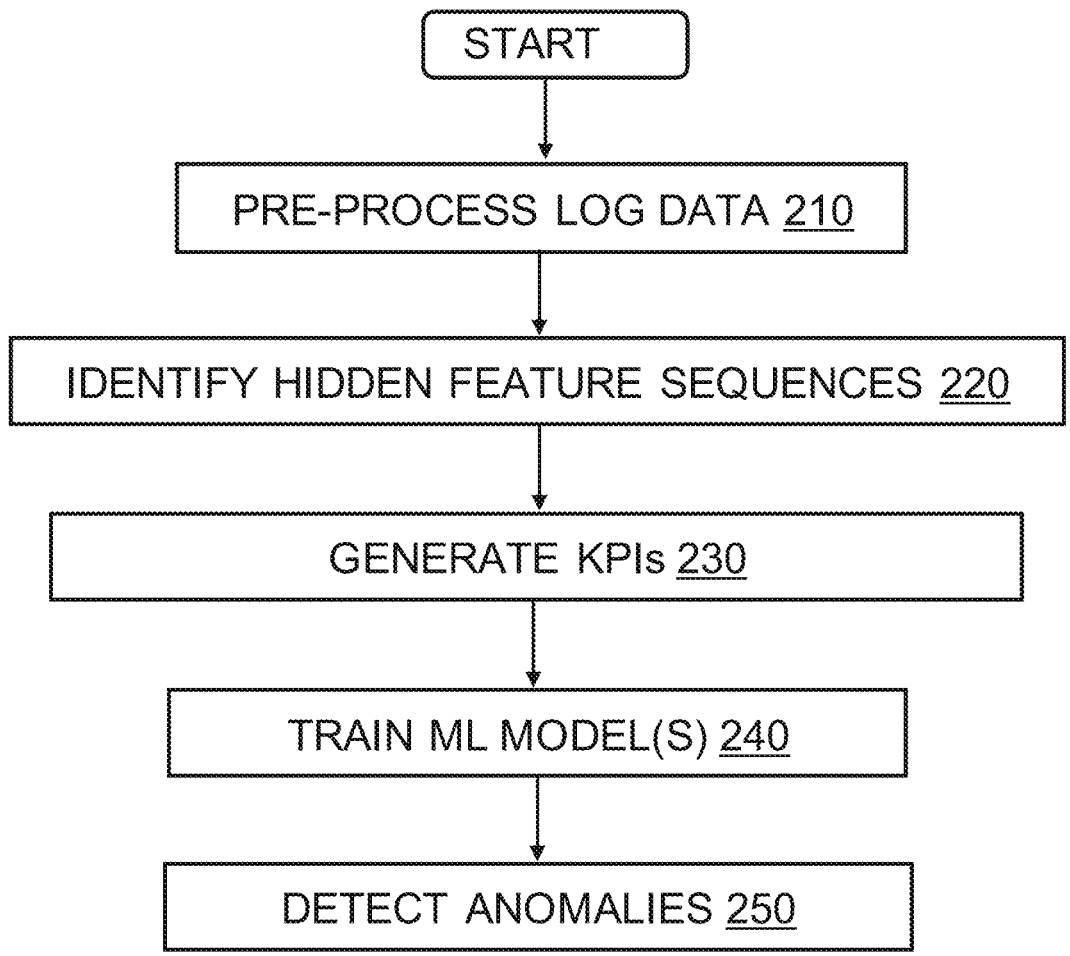
FIG. 2 provides a flowchart depicting an operational sequence, according to an embodiment of the invention.

FIG. 2 provides a flowchart 200, illustrating exemplary activities associated with the practice of the disclosure. After program start, at block 210, anomaly detection method 175 pre-processes log entries, removing formatting and other special characters and isolating the text portion of the entries.

At block 220, anomaly detection method 175 identifies log entry sequences. In an embodiment, the method assigns identifiers to log entries according to the content of the text portion of the entries. The method assigns the same identifier to identical text entries. The identified sequences constitute hidden features of the overall series of log entries.

At block 230 the method generates KPIs for the series of log entries. The KPIs relate to properties of the hidden feature sequences including sequence sentiments, sequence frequency within a defined time period, the time interval between repetitions of a given sequence, and the time duration associated with the occurrence of a complete sequence. The KPIs represent a distribution of the hidden feature sequence data from the overall series of log entries.

Disclosed embodiments may be used in any type of industry and use is not confined to information technology logs. Disclosed embodiments provide high confidence in identified anomalies by the use of different meta data KPIs. Disclosed embodiments look at multiple ways to find abnormal behaviours.

At block 240, the method trains one or more ML models using the KPI distributions. In an embodiment, the method trains an LSTM with an autoencoder, and LSTM with dropout, and an LSTM with certainty/uncertainty determination from the KPI distribution data. In this embodiment, for unsupervised learning the method normalizes the KPI data across at least one data dimension forming a statistical box for the KPI data. The normalization of the data removes anomalous/outlier data from the training data set. Training the model(s) with the normalized data set results in models which recognise the normalized data set as the normal state for the system activity log data. The trained models may be tested by using the models to analyze the training data without the statistical normalization. This analysis reveals data anomalies present in the historic data used for training but masked during the training process through the statistical box normalization process.

At block 250 the method analyzes new log entry sequences and identifies log entry anomalies using the trained ML models. In an embodiment, the method uses multiple ML models to analyze the input series of log entries. In this embodiment, the method identifies anomalous log entry sequence as a function of the majority of the ML model classification to reduce the likelihood of false positive identifications associated with the use of a single ML model for classification.

Figure 3:
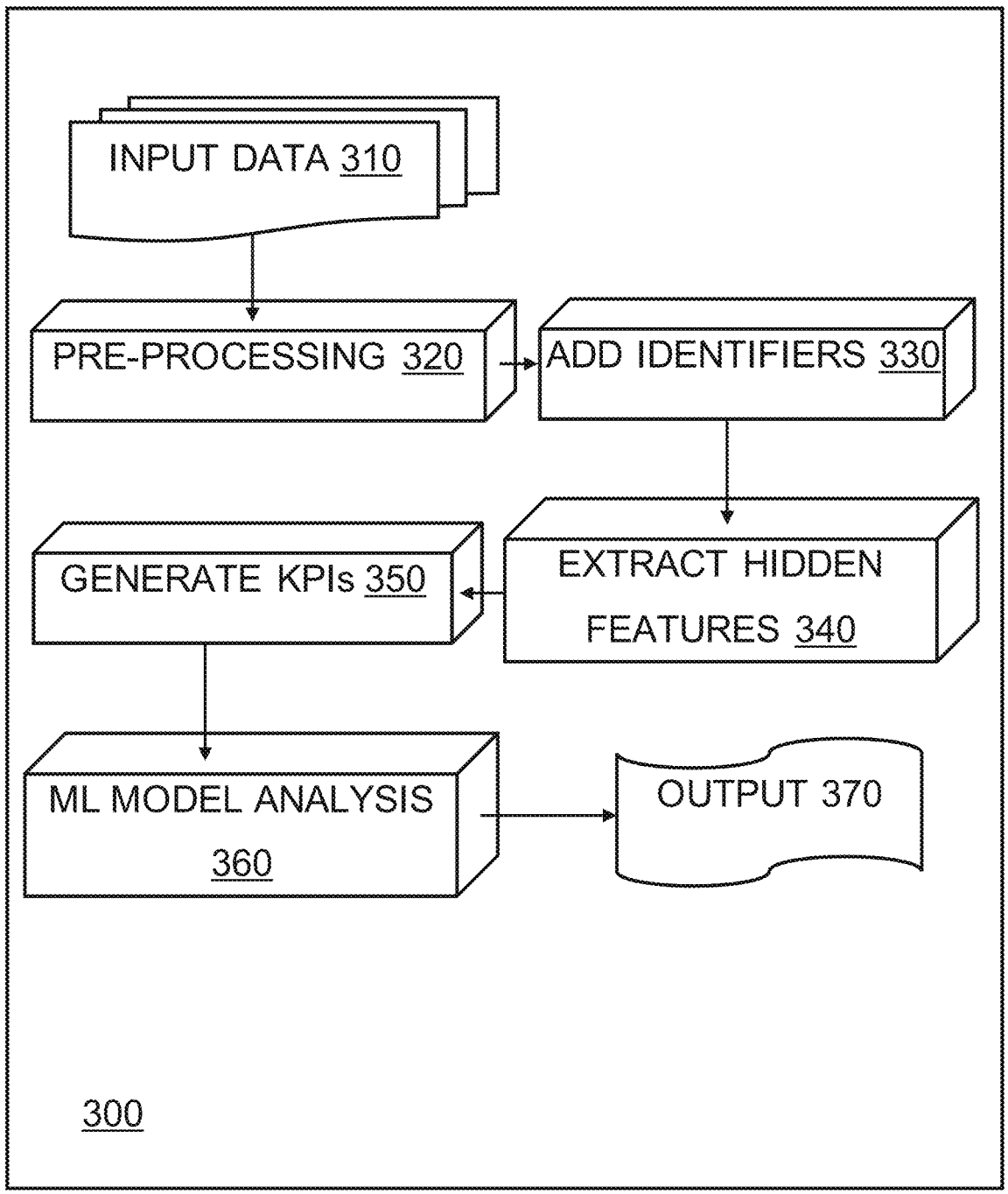
FIG. 3 depicts a data flow schematic, according to an embodiment of the invention.

Data flow schematic 300 of FIG. 3 illustrates the operational data flow according to an embodiment of the invention. As shown in the Figure, at 310, the processing system executing the method receives input data including time-series log entry data. At 320, the method pre-processes the time-series data removing special characters and isolating the text portions of the log entries.

After pre-processing, at 330 the method adds identifiers to the log entries according to the content of the log entry text portion. Identical log entries receive the same identifier. Log entries and identifiers are compiled in a data table.

At 340 the method analyzes the tabulated log entries to identify hidden features in terms of repeating sequences of log entries. For each possible sequence of log entries, the method analyzes the table to find other occurrences of the same log entry sequence. The method tracks the number of occurrences of each sequence and the duration of the sequence and the frequency of repetition of each of the sequences.

At block 350 the method generates KPIs for the hidden feature sequences. KPIs include sequence sentiments, sequence frequency, sequence intervals, and sequence duration values. For each entry the method determines a sentiment using a dictionary of log entry terms including a defined sentiment for each term. Any entry including at least one negative term receives a sentiment classification as negative.

In an embodiment, the method initially assigns a sentiment for every distinct (unique) log message template and calculates final sentiments for sequences according to the combination of individual sentiments. The method classifies sequences having at least one negative sentiment message as negative. The generated KPI distribution includes the distribution of positive and negative sentiments over regular time intervals, e.g., five minutes. In the real time anomaly detection analysis, the method collects all sequences in that interval and gets the counts of positive sentiment sequences and negative sentiment sequences. The collected counts are given to models for predicting whether it's an anomaly or not according to the normalized distribution of sentiments in the historic log entry data.

For sequence frequency, the method determines the distribution of values of the frequency of occurrence of each hidden feature sequence within a defined time interval, e.g., one second, one minute, one hour, etc., across the overall time interval of the provided input set of log entries.

For sequence interval, the method determines the distribution of time intervals between sequential occurrences of each hidden feature sequence across the overall set of input log entries.

For sequence duration the method determines the distribution of duration values for each of the hidden feature sequences across the overall set of input log entries.

For each of the defined KPI distributions, the method normalizes the KPI distribution data to remove outliers from the data set. The method utilizes the normalized data to train one or more ML models to recognize the normal state of the system according to the normalized data and to identify anomalous input data as any data lying outside the normal state of the system as defined by the model trained using the KPI distribution data.

At 360, the method trains multiple ML models using the normalized KPI distribution data. The method trains ML models such as LSTM with autoencoder, LSTM with uncertainty/certainty, and LSTM with dropout.

After training the ML models, the method processes new time series log entry data by pre-processing 310, assigning IDs 320, detecting hidden feature strings 330, determining the KPIs for the new time series data 350, and detecting anomalies in the new time-series data using the trained ML models at 360. The method outputs information regarding the detected anomalies at 370.

In an embodiment, the execution of the anomaly detection method utilize edge cloud or cloud resources in addition to local computing resources to enable the benefits of cloud resources including the ability to alter the size of the utilized computing resource environment to match the momentary computing needs of the method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
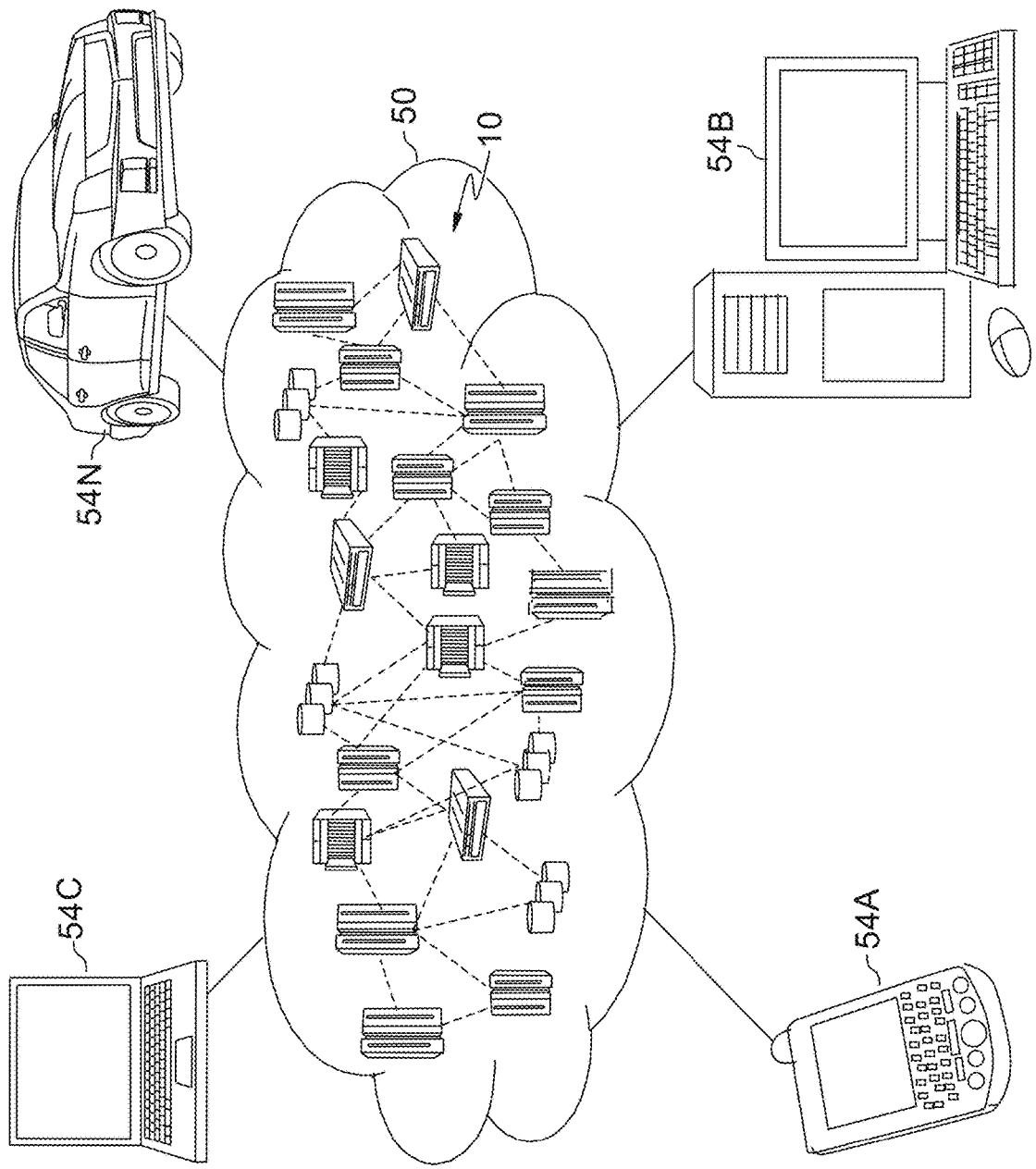
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
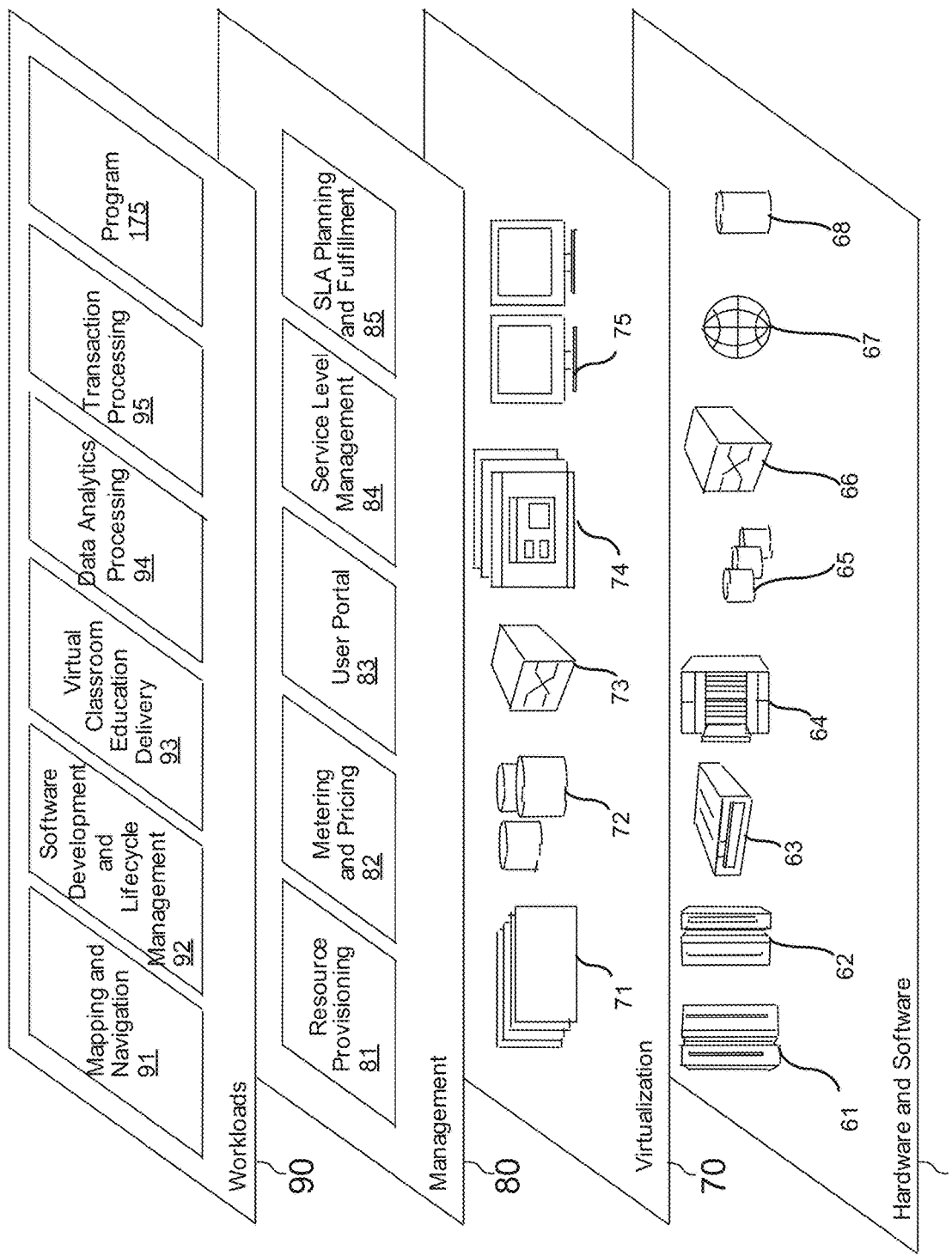
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for detecting log data anomalies, the method comprising:
   pre-processing, by one or more computer processors, log data entries, wherein pre-processing log data entries includes separating text-only portions of the entries;
   identifying, by the one or more computer processors, sequences of the log data entries;
   generating, by the one or more computer processors, at least one key performance indicator (KPI) for the log data entries according to the sequences;
   training, by the one or more computer processors, a machine learning (ML) model comprising at least three separate ML model structures consisting of a long short-term memory (LSTM) model with an autoencoder, an LSTM model with certainty/uncertainty, and an LSTM with dropout according to the KPI; and
   identifying, by the one or more computer processors, log data entry anomalies according to a majority of the at least three separate ML model structures, the identified log data entry anomalies comprising hidden features extracted from the log data entries, the hidden features relating to meta data of the log data entries rather than specific details of any single entry or set of log data entries, wherein the hidden features are repeating sequences of the log data entries associated with log entry sentiment sequences, a frequency of log entry sequences over regular time intervals, time intervals between specific sequences, and time duration associated with an occurrence of specific log data entry sequences.

2. The computer implemented method according to claim 1, wherein the at least one KPI is selected from the group consisting of: sequence sentiments, sequence frequency, sequence timing, and sequence duration.

3. The computer implemented method according to claim 1, wherein identifying sequences of log data entries comprises identifying the repeating sequences of log data entries, and further comprising applying statistical methods to raw log entry data to remove outliers prior to training the ML model with the data, wherein the statistical methods provide statistical normalization of the raw log entry data which enables unsupervised training of the ML model, and to test the trained ML model, the trained ML model processes raw training data without statistical normalization to detect anomalies in the training log entry data, after training and testing, processing new log entry data using the trained ML model.

4. The computer implemented method according to claim 1, wherein training the ML model comprises using normalized historic time-series sequence data and further comprising assigning identifiers to pre-processed data, generating distributions of the KPI associated with system activities, training the ML models using the sequence of the hidden features and KPI distributions, and processing new log entry data to identify anomalies using the trained ML model.

5. The computer implemented method according to claim 1, wherein training the ML model includes training an ML model selected from the group consisting of a long short-term memory (LSTM) model with an autoencoder, an LSTM model with certainty/uncertainty, and an LSTM with dropout.

6. A computer program product for detecting log data anomalies, the computer program product comprising one or more computer readable storage devices and collectively stored program instructions on the one or more computer readable storage devices, the stored program instructions comprising:
   program instructions to pre-process log data entries;
   program instructions to identify sequences of the log data entries;
   program instructions to generate at least one key performance indicator (KPI) for the log data entries according to the sequences;
   program instructions to train a machine learning (ML) model comprising at least three separate ML model structures consisting of a long short-term memory (LSTM) model with an autoencoder, an LSTM model with certainty/uncertainty, and an LSTM with dropout according to the KPI;
   program instructions to identify log data entry anomalies according to a majority of the at least three separate ML model structures, the log data entry anomalies being hidden log data features associated with any of log entry sentiment sequences, frequency of log entry sequences over regular time intervals, time intervals between specific sequences, and time duration associated with an occurrence of specific log data entry sequences; and
   program instructions to detect system abnormalities by identifying the log entry sequences outside a normal distribution of the log entry sequences in any of four dimensions comprising the log entry sentiment sequences, the frequency of the log entry sequences over regular time intervals, the time intervals between the specific sequences, and the time duration associated with the occurrence of the specific log data entry sequences.

7. The computer program product according to claim 6, wherein the at least one KPI is selected from the group consisting of: sequence sentiments, sequence frequency, sequence timing, and sequence duration.

8. The computer program product according to claim 6, wherein pre-processing log data entries includes separating text-only portions of the entries and compiling tables with the text-only portions wherein each table entry includes a single text portion from a corresponding log entry.

9. The computer program product according to claim 6, wherein identifying sequences of log data entries comprises identifying repeating sequences of log data entries.

10. The computer program product according to claim 6, wherein training the ML model comprises using pre-processed, normalized historic time-series sequence data without special characters.

11. The computer program product according to claim 6, wherein training the ML model comprises training at least three separate ML model structures and wherein identifying a log data entry anomaly according to the machine learning model comprises identifying a log data entry anomaly according to a majority of the three separate ML model structures.

12. A computer system for detecting log data anomalies, the computer system comprising:
   one or more computer processors;
   one or more computer readable storage devices; and
   stored program instructions on the one or more computer readable storage devices for execution by the one or more computer processors, the stored program instructions comprising:
      program instructions to pre-process log data entries which includes removing special characters and system parameter strings to yield a text portion from each activity log entry;
      program instructions to identify sequences of the log data entries;
      program instructions to generate at least one key performance indicator (KPI) for the log data entries according to the sequences;
      program instructions to train a machine learning (ML) model comprising at least three separate ML model structures consisting of a long short-term memory (LSTM) model with an autoencoder, an LSTM model with certainty/uncertainty, and an LSTM with dropout according to the KPI; and
      program instructions to identify a log data entry anomaly according to the machine learning model, wherein identifying a log data entry anomaly according to the at least three separate ML model structures comprises identifying a log data entry anomaly according to a majority of the three separate ML model structures, and
      wherein the log data entry anomaly comprises anomalies according to hidden features extracted from time series log entry data which are outside a normal distribution of log entry sequences in any of four dimensions.

13. The computer system according to claim 12, wherein the at least one KPI is selected from the group consisting of: sequence sentiments, sequence frequency, sequence timing, and sequence duration, and further comprising assigning identifiers to pre-processed data, generating distributions of the at least one KPI which is associated with system activities, training the ML models using the sequence of the hidden features and KPI distributions, and processing new log entry data to identify anomalies using the trained ML model.

14. The computer system according to claim 12, wherein identifying sequences of log data entries comprises identifying repeating sequences of log data entries.

15. The computer system according to claim 12, wherein training the ML model comprises using normalized historic time-series sequence data.

16. The computer system according to claim 12, wherein training the ML model includes training an ML model from the group consisting of: a long short-term memory (LSTM) model with an autoencoder, a LSTM model with certainty/uncertainty, and an LSTM with dropout.

17. The computer implemented method according to claim 1, wherein training the ML model includes training a long short-term memory (LSTM) model with an autoencoder, wherein training the LSTM model with the autoencoder comprises extracting features from new log data sequences according to training with normalized historic data, and comparing the extracted features to feature distribution for a normalized data set.

18. The computer implemented method according to claim 1, wherein training the ML model includes training a long short-term memory (LSTM) model with certainty/uncertainty, wherein training the LSTM model with certainty/uncertainty comprises extracting a feature embedding for new log entry sequence data, and determining a certainty level for the data relating the certainty that the feature embedding of the new log entry sequence data conforms to feature embedding distribution of the training data.

19. The computer implemented method according to claim 1, wherein training the ML model includes training a long short-term memory (LSTM) with dropout, wherein training an LSTM with dropout comprises randomly dropping out recurrent neural network (RNN) node weights during training epochs.

\* \* \* \* \*